United States Patent [19]
Fresco

[11] Patent Number: 5,609,278
[45] Date of Patent: Mar. 11, 1997

[54] ARTICULATED BACKPACK APPARATUS

[76] Inventor: Andre Fresco, 2650 Cottage Grove Ave. #5, Des Moines, Iowa 50311

[21] Appl. No.: 342,153

[22] Filed: Nov. 18, 1994

[51] Int. Cl.$^6$ .................................. A45F 4/02; B62J 9/00
[52] U.S. Cl. .......................... 224/153; 224/582; 224/585; 224/634; 224/430; 224/417; 224/637; 224/901.8
[58] Field of Search .................................. 224/153, 156, 224/211, 210, 215, 32 A, 31, 582, 585, 634, 429, 430, 417, 637, 901.8

[56] References Cited

U.S. PATENT DOCUMENTS

| | | | |
|---|---|---|---|
| 3,355,075 | 11/1967 | Dean | 224/262 |
| 3,786,972 | 1/1974 | Alley | 224/153 |
| 4,214,685 | 7/1980 | Pletz | 224/211 |
| 4,248,367 | 2/1981 | Buel | 224/153 |
| 4,318,502 | 3/1982 | Lowe et al. | 224/153 |
| 4,362,307 | 12/1982 | Nakatani | 224/153 |
| 4,433,802 | 2/1984 | Woolf | 224/153 |

FOREIGN PATENT DOCUMENTS

1604449   12/1981   United Kingdom ................... 224/153

Primary Examiner—Linda J. Sholl
Attorney, Agent, or Firm—Brett J. Trout

[57] ABSTRACT

An articulated backpack apparatus for transporting material while attached to a user in which an upper storage element of the apparatus is capable of pivotal movement in relationship to a lower storage element of the apparatus while attached to the user. The backpack apparatus is capable of being collapsed into a satchel orientation so that the backpack apparatus may be carried by hand. From the satchel orientation the upper storage element and lower storage element may be moved apart by a pair of extensible supports so that the backpack apparatus may be secured over the wheel of bicycle in a pannier orientation. Additionally, the backpack apparatus is provided with a pull handle, an extensible shaft, and wheels, so that the backpack apparatus may be rolled along the ground in a pull cart orientation. The backpack apparatus is provided with a belt member which provides additional support to the backpack apparatus as it is worn by the user, while still allowing a full range of rotational movement relative to the backpack apparatus.

9 Claims, 6 Drawing Sheets

ARTICULATED BACKPACK APPARATUS

BACKGROUND OF THE INVENTION

The present invention relates generally to backpacks and, in particular, to an articulated backpack apparatus for allowing an upper storage element to pivot in relationship to a lower storage element when the articulated backpack apparatus is secured to a user, for allowing the lower backpack element to rotate relative to the user while remaining secured to and supported by the user, and for allowing the articulated backpack assembly to be folded and carried by the user.

Backpacks which fold to be carried either at the side of a user to or to be used as saddle bags on a bicycle are known in the art. Examples of these devices can be found in U.S. Pat. Nos. 3,786,972 and 4,491,258. Both of these devices, however, use a rigid support to maintain the enclosures in a substantially rigid position relative to the user. Not only is the conversion of such devices from the backpack orientation to the bicycle orientation time consuming, the rigid support structure of these devices restricts a user's movement since they do not follow the curve of the user's spine as the user bends forward.

An additional problem associated with backpacks of the prior art has been the support of the lower portion of the backpack on the user, while still allowing the user a full range of motion. Typically, the prior art devices allow a full range of motion by eliminating a waist belt such as shown in U.S. Pat. No. 3,786,972 or they support the backpack with a belt and restrict the user's movement relative to the backpack as shown in U.S. Pat. No. 4,491,258.

Accordingly, it is an object of the proposed invention to provide an articulated backpack assembly having an upper storage element and a lower storage element which pivot relative to one another as the backpack is being worn by a user. Since the backpack pivots while being worn, the user's range of motion is not restricted.

A further object of this invention is to provide an articulated backpack which folds into a satchel. This feature is achieved by fully pivoting the frame so that the upper storage element and the lower storage element move from a side-by-side orientation to a face-to-face orientation.

Yet another object of the invention is to provide a backpack with a supported lower storage element which maintains support of the backpack throughout a full range of pivotal motion of the user in relationship to the backpack. A belt is provided around the user and is pivotably connected to the lower storage element of the backpack, which allows the lower portion of the backpack to be supported without restriction of the user's movement relative to the backpack.

Another object of the invention is to provide a backpack with a quick-release assembly which allows both the lower portion and upper portion of the backpack to be quickly removed from the user.

Still another object of the invention is to provide a backpack which is foldable into a pannier capable of being secured over the wheel of a bicycle. Once the upper storage element and the lower storage element have been placed into a face-to-face orientation, the frame may be manipulated to move the upper storage element away from the lower storage element to provide a space therebetween for a wheel of a bicycle.

Yet another object of the invention is to provide a backpack which is easily convertible into a wheeled cart. By providing the backpack with wheels and an extensible handle, the backpack may be fully pivoted into the satchel orientation and the extensible handle raised to allow the backpack to be wheeled through airports and the like.

Other objects of the invention include the provision of a remote release assembly which allows the user easy access to the device which releases the lower storage element from the belt fixed around the user's waist. This remote release allows the backpack to be released even more quickly with less effort. Additionally, the upper storage element and the lower storage element are releasably secured to the articulated frame to allow cleaning and repair of the storage elements.

These and other objects of the invention will become apparent upon reference to the following specification, drawings, and claims.

SUMMARY OF THE INVENTION

The present invention comprises an articulated backpack apparatus for transporting material while attached to a user. The apparatus is provided with an upper storage element and a lower storage element operably secured to the upper storage element by pivot means for allowing the upper storage element to pivot relative to the lower storage element when the apparatus is attached to the user. A shoulder strap is operably secured to the upper storage element and means are provided for releasably securing the lower storage element to a belt member secured around the user's waist. The securing means allows rotational movement of the lower storage element relative to the belt member to reduce restriction of the user's movement. The pivot means enables the upper storage element to pivot from a side-by-side relationship relative to the lower storage element to a face-to-face relationship. Means are operably secured to the upper storage element for allowing the apparatus to be lifted when the apparatus is placed in the face-to-face relationship.

In the preferred embodiment, the apparatus is provided with a remotely operated quick release locking mechanism which allows the belt member to be quickly and easily secured to the lower storage element. The apparatus is also preferably provided with means for attaching the apparatus to a bicycle over one of the wheels of the bicycle. Additionally, the apparatus is preferably provided with an extensible handle and wheels to allow the apparatus to be pulled along the ground.

DETAILED DESCRIPTION OF THE PRESENT INVENTION

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 1:
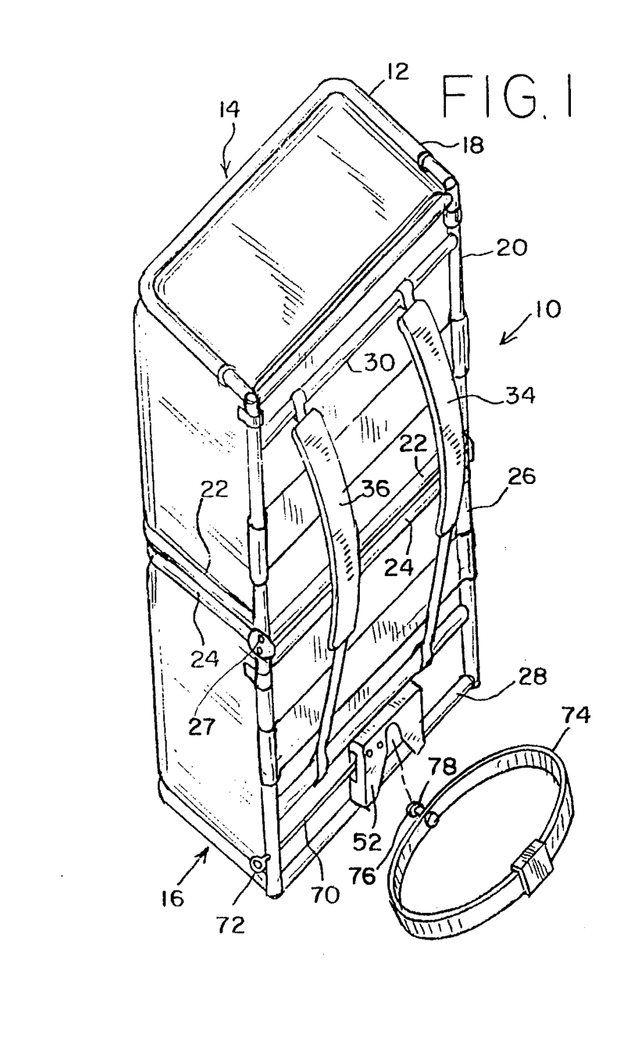
FIG. 1 is a front perspective view of the invention with the upper storage element in a side-by-side orientation relative to the lower storage element.
Figure 4:
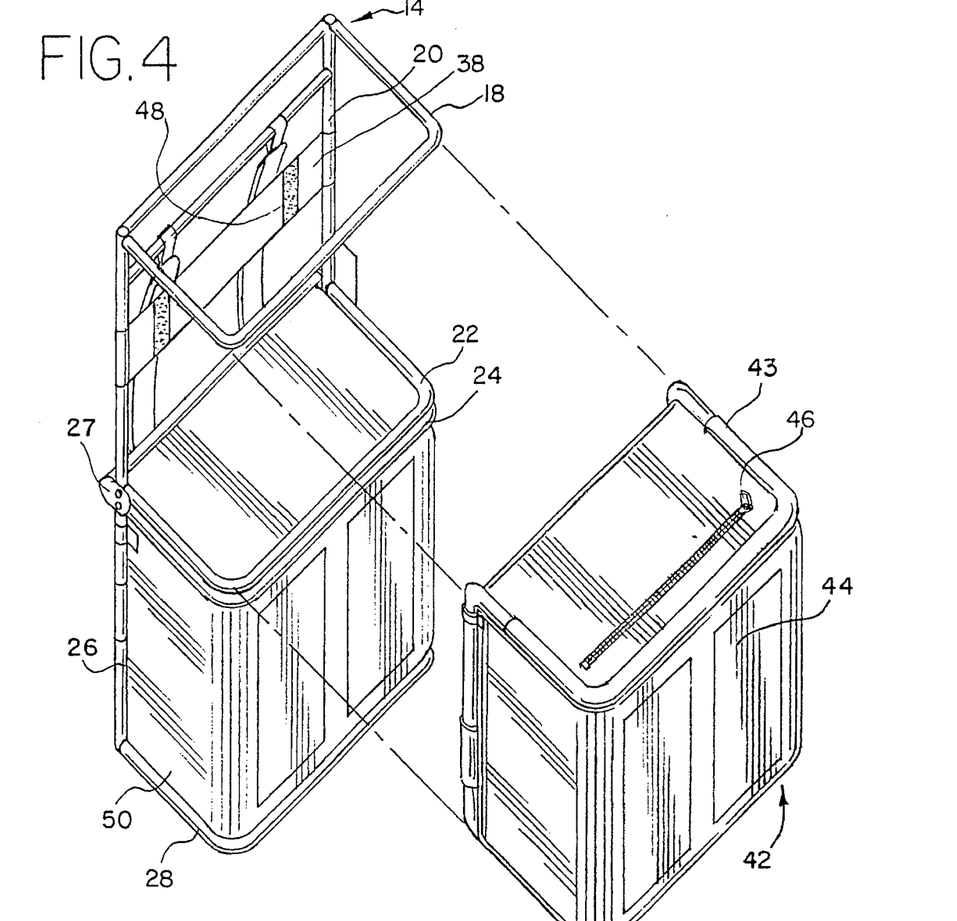
FIG 4 is a rear perspective view of the present invention showing the upper storage element removed from the apparatus.

The present inventive articulated backpack apparatus 10 is shown in the backpack orientation in FIG. 1. The apparatus is provided with a tubular aluminum frame 12 having an upper section 14 and a lower section 16. The upper section 14 is preferably C-shaped having a top 18, a back 20, and a bottom 22 (FIG. 4). Similarly, the lower section 16 is C-shaped with a top 24, a back 26, and bottom 28. Secured between the upper section 14 and the lower section 16 are a pair of hinges 27. The hinges 27 allow the apparatus 10 to fold into a satchel orientation (FIGS. 8–9) and allow the apparatus 10 to conform to the back of a user (not shown) as the user crouches, kneels, and bends. If the apparatus 10 was completely rigid and could not bend, the apparatus 10 would restrict the user's freedom of movement. The tops 18 and 24, backs 20 and 26, and the bottoms 22 and 28, are all preferably square sections of tubular aluminum, connected to one another by weldments, rivets or similar connection means (FIG. 4). High impact plastic may be substituted for tubular aluminum, if a more inexpensive construction of the present device is desired.

Figure 2:
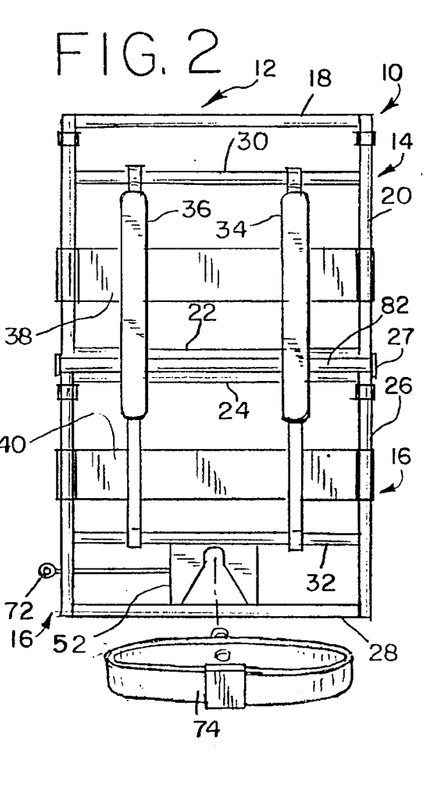
FIG. 2 is a front elevational view of the present invention showing the remote release means for the locking mechanism extending beyond the transverse confines of the backpack.
Figure 8:
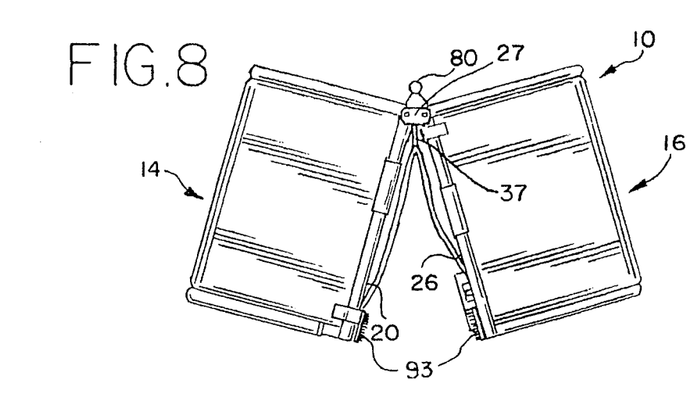
FIG 8 is a side elevation showing the lower storage element being pivoted toward the upper storage element.

Both the back 20 of the upper section 14 and the back 26 of the lower section 16 are provided with cross supports 30 and 32, which are preferably formed of the same tubular aluminum as the frame 12 (FIG. 2). Interconnecting the cross supports 30 and 32 are a pair of flexible shoulder straps 34 and 36. The flexible shoulder straps 34 and 36 are maintained close to the frame 12 by a pair of elastic retaining members 37 (FIGS. 2 and 8). The elastic retaining members 37 are secured on one end to the flexible shoulder straps 34 and 36, and on the other end to a bracket 82.

Provided across the back 20 of the upper section 14 is an upper fabric support 38 which is preferably nylon, but of course may be leather, canvas or similar flexible support material (FIG. 4). The upper fabric support 38 is secured to the back 20 of the upper section 14 by rivets or similar securement means. Similarly, a lower fabric support 40 is provided across the back 26 of the lower section 16 (FIG. 2).

Provided within the upper section 14 is an upper storage element 42 (FIGS. 2 and 4). The upper storage element 42 is preferably constructed of nylon and is preferably provided with a frame 43 constructed of plastic or similar supportive material which adds structure to the upper storage element 42 and which guides the upper support element 42 onto the frame 12. The upper support element 42 is secured to the upper fabric support 38 and to the frame 12 by latch and hook material 48 or by similar releasable securement means. Although the upper storage element 42 may be permanently secured to the frame 12, the releasable securement allows for the simple removal, replacement, and repair of the upper storage element 42. The upper storage element 42 is preferably provided with a plurality of pockets 44 and zippers 46 to allow compartmentalization and easy access to items stored within the apparatus 10. A lower storage element 50, similar to the upper storage element 42, is provided within the lower section 16 of the apparatus 10. If a more durable device is desired, the upper and lower storage elements 42 and 50 may be constructed of rigid plastic or sheet metal (not shown) instead of nylon.

Figure 5:
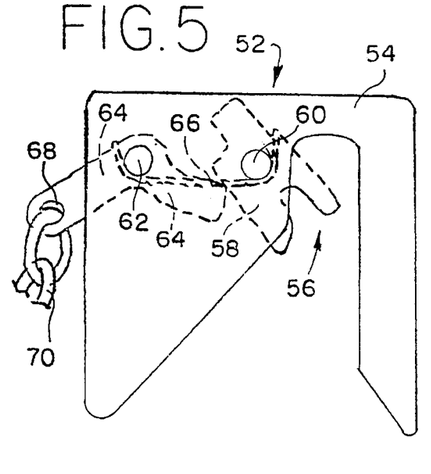
FIG 5 is a front view in partial phantom of the locking means of the present invention, showing the locking mechanism in the unlocked position.
Figure 6:
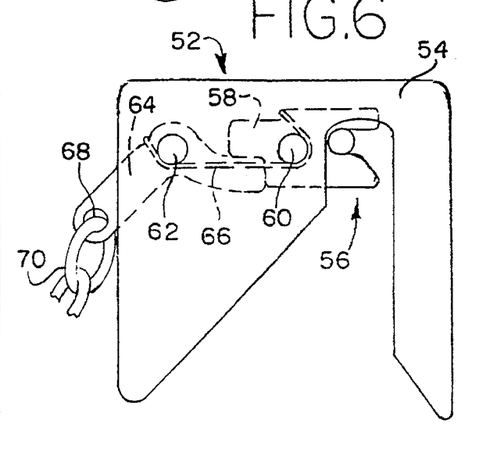
FIG 6 is a front view in partial phantom of the locking mechanism of the present invention, showing the locking mechanism in the locked position.

Provided between the cross support 32 of the lower section 16 and the bottom 28 of the lower section 16 is an automatic locking assembly 52 (FIG. 2). In the preferred embodiment of the present invention, the automatic locking assembly 52 is of the type manufactured by Eberhard, but any suitable automatic pin locking assembly may be used. As shown in FIG. 5, the automatic locking assembly 52 has a guideplate 54 which is provided with a pin slot 56. A locking claw 58 is pivotably secured to the guideplate 54 by a pivot pin 60. A second pivot pin 62 pivotably secures a release member 64 to the guide plate 54. A torsion spring 66 is secured on one end to the locking claw 58, wound around both pins 60 and 62 and secured on the other end to the release member 64. The torsion spring 66 is wound around both pins 60 and 62 to bias the locking claw 58 and release member 64 toward a release position as shown in FIG. 5. The release member 64 is provided with a hole 68 through which is provided a release cord 70. The release cord 70 extends through the back 26 of the lower section 16 of the frame 12 where it is connected to a handle 72 (FIG. 1). As shown in FIG. 1, the release cord 70 and handle 72 may be placed for easy access by the user's right hand (not shown). The release cord 70 and handle 72 may, of course, be placed anywhere around the frame 12 which allows ready access by the user. A wide belt 74, constructed of nylon or similarly sturdy material, is provided with a pin 76 having a head 78 which is larger than the pin 76. The pin 78 is of a sufficient diameter to be engaged by the locking claw 58 of the automatic locking assembly 52 (FIGS. 1 and 5). Since the belt 74 remains attached to the user even when the frame 12 is removed from the user, the belt 74 may be used for carrying various tools and supplies as well as for supporting the frame 12.

Figure 9:
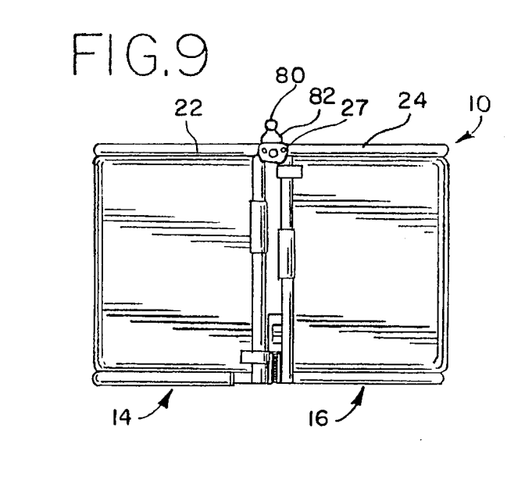
FIG 9 is a side elevation showing the backpack in the satchel orientation.
Figure 10:
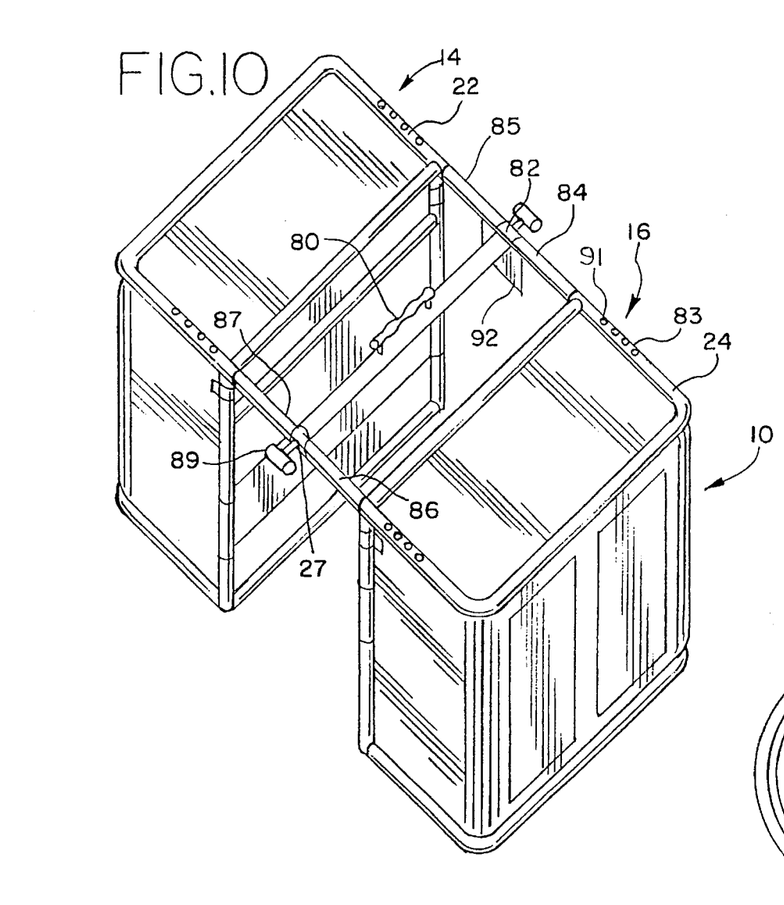
FIG 10 is a top perspective view of the present invention showing the frame extended outward to place the backpack in the pannier orientation.

A handle 80 is secured to the bracket 82 to allow the apparatus 10 to be carried in the satchel orientation (FIG. 9). The bracket 82 extends the width of the apparatus 10 and is secured to the pair of hinges 27 connected to the frame 12. The hinges 27 are secured to the bottom 22 of the upper section 14 and to the top 24 of lower section 16 by four supports 84, 85, 86 and 87 which are secured to the hinges 27 and extensible relative to the upper and lower sections 14 and 16 (FIG. 10). The supports 84, 85, 86 and 87 are preferably constructed of tubular aluminum, or other suitable material, of a diameter smaller than the upper and lower sections 14 and 16 so that they may be inserted into the upper and lower sections 14 and 16 for telescopic movement in relationship thereto. The hinges 27 extend only one hundred and eighty degrees, to prevent the upper section 14 from collapsing into the lower section 16 when the supports 84, 85, 86 and 87 are extended. Friction knobs 89 may be secured to the hinges 27, to maintain the hinges 27 in the open position.

Figures 13, 14:
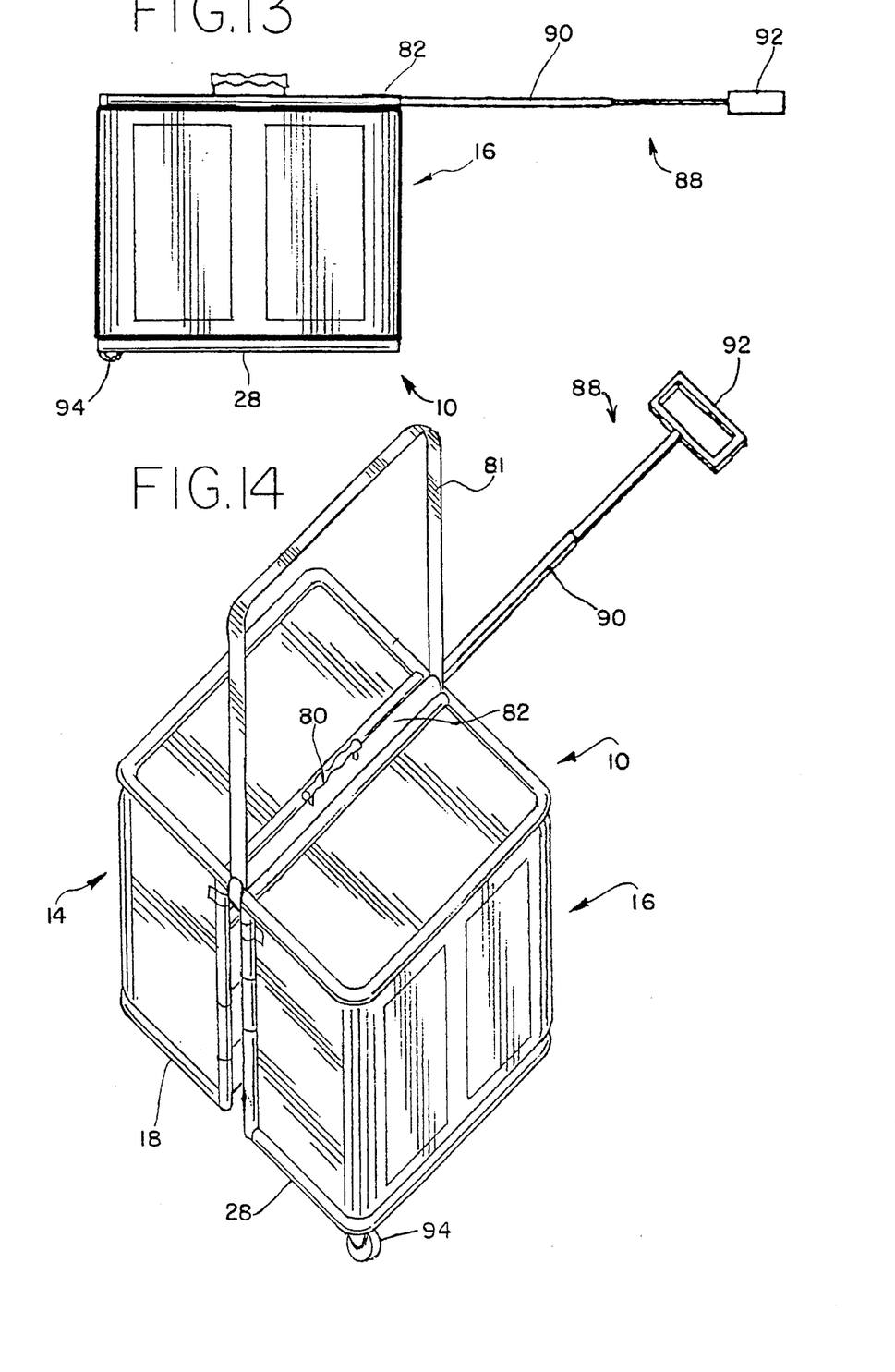
FIG 13 is a side elevation showing the backpack placed in the pull cart orientation with an extensible handle and a wheel assembly.
FIG. 14 is a top perspective view of the present invention showing the backpack in the pull cart orientation with the handle extended.

The apparatus 10 is preferably provided with an extensible handle assembly 88 having an extensible shaft 90 and a pull handle 92 (FIG. 14). The pull handle 92 is preferably hingeably attached to the extensible shaft 90 for downward pivoting in relationship thereto. The pull handle 92 may thereby be pivoted flush with the apparatus 10 when the extensible shaft 90 is retracted into the bracket 82. Wheels 94 may be attached to the top 18 of the upper section 14 and to the bottom 28 of the lower section 16 to allow the apparatus 10 to roll as it is being pulled by the pull handle 92 (FIGS. 13 and 14).

To use the apparatus 10 as a backpack, the upper section 14 and lower section 16 are positioned in the side-by-side orientation shown in FIG. 1. The belt member 74 is then placed around the waist of the user and the shoulder straps 34 and 36 are placed over the shoulders of the user (FIG. 1). The frame 12 is then raised a sufficient height to allow the guideplate 54 to engage the pin 76 of the belt member 74 (FIGS. 1 and 5). The pin 76 slides along the guideplate 54 until it engages the locking claw 58. As the frame 12 is lowered, the locking claw 58 pivots until the release member 64 engages and secures the locking claw 58 against pivotal displacement.

Figure 3:
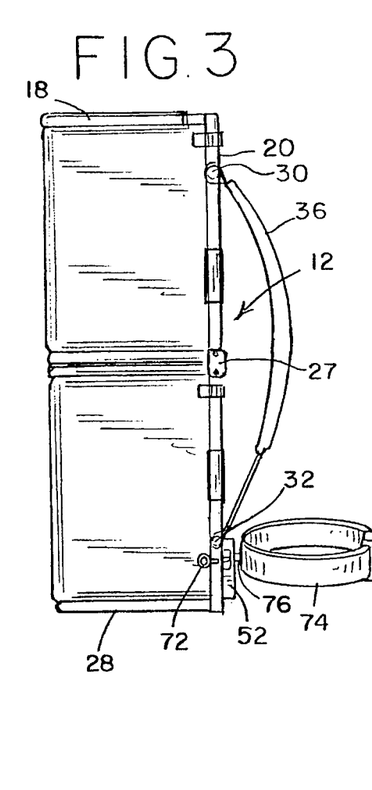
FIG 3 is a side elevational view showing the pin of the belt member secured to the lower storage element of the backpack.

While the automatic locking assembly 52 allows the belt member 74 to aid in the support of the apparatus 10, the locking claw 58 and pin 76 securement allows pivotal movement of the automatic locking assembly 52 and frame 12 relative to the pin 76 (FIGS. 1 and 5). This arrangement is particularly advantageous in situations where the user is bending at the waist. The apparatus 10 thereby provides a large range of movement for the user, while maintaining the added support of the belt member 74. As the user bends forward and backward, the upper section 14 and lower section 16 of the frame 12 pivot relative to one another, so that the user's range of movement is not unduly restricted. Further aiding the user's freedom of movement is the pivotal connection of the pin 76 to the automatic locking assembly 52 (FIG. 3). This connection allows the user the ability to crouch, kneel, and bend laterally at the side without undue restriction.

To remove the apparatus 10, the user grasps the handle 72 to pull the release cord 70 and release the automatic locking assembly 52 (FIGS. 1 and 5). The release member 64 releases the locking claw 58 and the torsion spring 66 moves the locking claw 58 into the release position. The belt member 74 is thereby released from the frame 12 and the apparatus 10 can be quickly removed by the user simply by slipping the shoulder straps 34 and 36 off of the user's shoulders.

Figure 7:
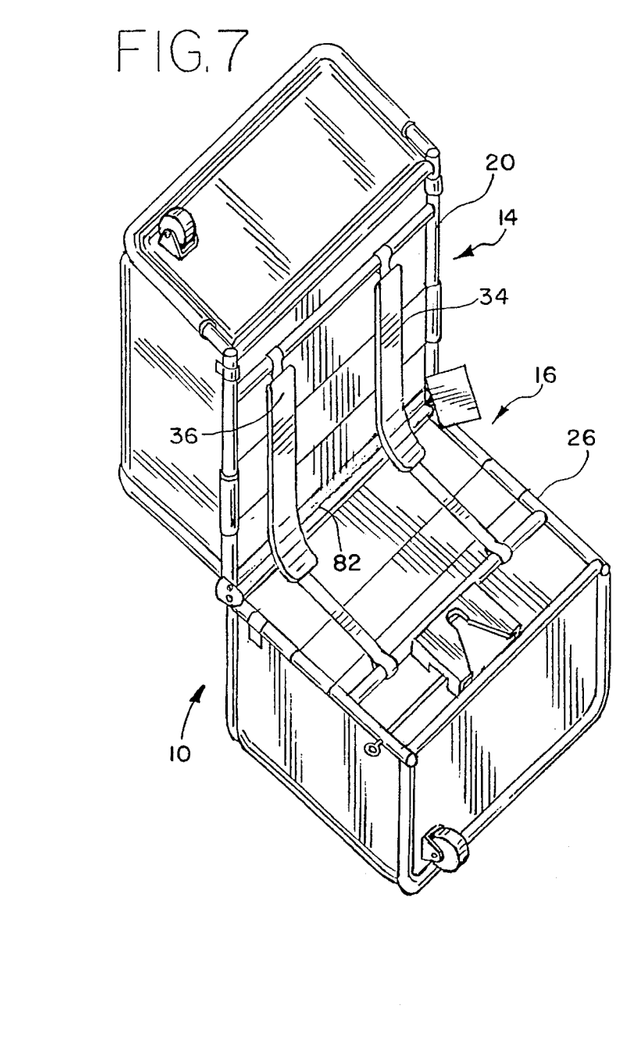
FIG 7 is a perspective view of the present invention showing the lower storage element being pivoted toward the upper storage element.

If it is desired to carry the apparatus 10 in the satchel orientation, the user need only fold the upper section 14 and the lower section 16 from a side-by-side orientation as shown in FIG. 1 to the face-to-face orientation as shown in FIG. 9. As the upper section 14 moves toward the lower section 16, the elastic retaining members 37 pull the flexible shoulder straps 34 and 36 toward the bracket 82 and out of the way (FIGS. 7 and 8). Preferably, the back 20 of the upper section 14 and the back 26 of the lower section 16 are provided with latch and hook material 93, or a similar locking arrangement, to maintain the upper section 14 in contact with the lower section 16 when the apparatus 10 is in the satchel orientation.

Once the apparatus 10 is in the satchel orientation, it may be carried with the handle 80, or if desired, an optional shoulder strap 81 constructed of nylon, or similarly supportive material, may be attached to the frame 12 as shown in FIG. 14. The shoulder strap 81 allows the user to carry the apparatus 10 while leaving the user's hands free. Since the back 20 of the upper section 14 is in contact with the back 26 of the lower section 16, the upper storage element 42 and lower storage element 50 are readily accessible to the user when the apparatus 10 is being carried by the shoulder strap 81.

Figure 11:
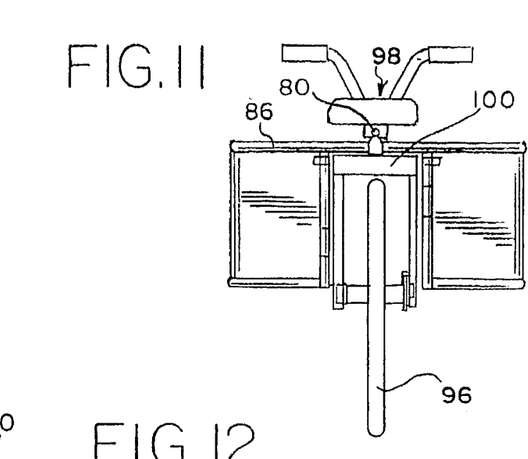
FIG 11 is a rear elevation showing the backpack in the pannier orientation and secured to a bicycle.

If it is desired to carry the apparatus 10 on a bicycle 98 or other two-wheeled vehicle, the lower section 16 is pulled away from the upper section 14 while the apparatus 10 is in the satchel orientation (FIGS. 10 and 11). This moves the upper section 14 and the lower section 16 along the supports 84 and 86 and provides a space between the lower section 16 and upper section 14 so that the apparatus 10 may be provided over a wheel 96 of the bicycle 98. The top 24 of the lower section 16 and the bottom 22 of the upper section 14 are each provided with holes 83 which accommodate spring-loaded pins 91 mounted on the supports 84, 85, 86 and 87. As the upper section 14 and the lower section 16 are moved along the supports 84, 85, 86 and 87, the pins 91 extend and lock into the holes 83. The pins 91 thereby prevent the upper section 14 and the lower section 16 from inadvertently moving along the supports 84, 85, 86 and 87 While the pins 91 are used in the preferred embodiment of the present invention, it should be noted that any similar locking assembly may be used.

Figure 12:
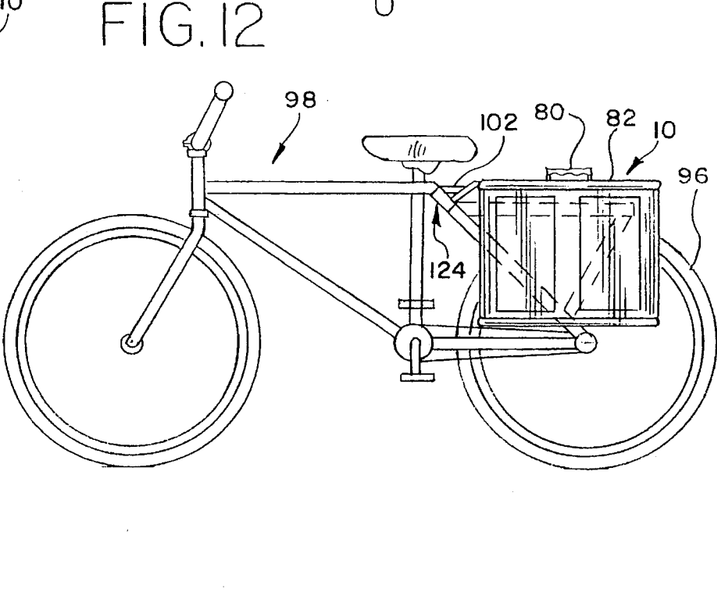
FIG 12 is a side elevation showing the backpack of the present invention in the pannier orientation and secured to a bicycle.

To release and retract the supports 84, 85, 86 and 87 into the upper section 14 and the lower section 16, or to move the pins 91 to different holes 83, the pins 91 are merely depressed far enough so that the supports 84, 85, 86 and 87 may be slid within the upper section 14 and lower section 16 (FIG. 10). After the upper section 14 and the lower section 16 have been moved out along the supports 84, 85, 86 and 87 and locked in place with the pins 91, the apparatus 10 may be attached to the bicycle 98 (FIGS. 10 and 12). If the bicycle 98 is provided with a rack 100, the apparatus 10 may be releasably secured to the rack 100 by any suitable locking device. Alternatively, the bicycle 98 may be fitted directly to the bicycle 98 with a custom mounting bracket 102 such as that shown in FIG. 15.

Figure 15:
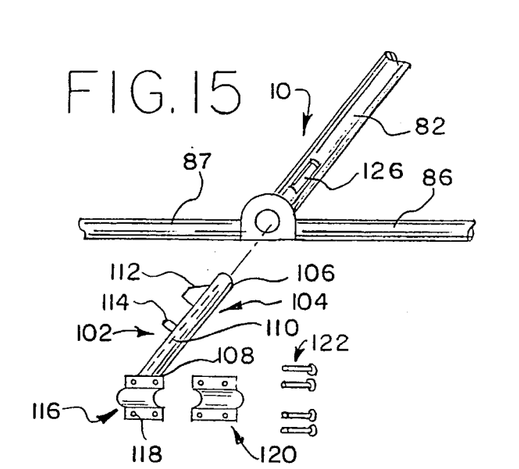
FIG. 15 is a perspective view in partial cross-section showing the bicycle mounting bracket as it attaches to the bracket of the apparatus.

The mounting bracket 102 is preferably constructed of a tapered hollow tube 104 which is round on one end 106 and flat on the other end 108 (FIG. 15). The round end 106 is preferably of a diameter smaller than the bracket 82 of the apparatus 10 so that the round end 106 may be fitted inside the bracket 82. The hollow tube 104 is preferably provided on its interior with a flexible strip of metal 110. The strip 110 is secured on one end to the interior of the hollow tube 104. Secured to the strip 110 are a latch 112 and a pin 114. Both the latch 112 and the pin 114 protrude through holes (not shown) in the hollow tube 104. The flat end 108 of the hollow tube 104 is welded to a semi-cylindrical frame mount 116. The frame mount 116 is provided with holes 118 which allow a mated semi-cylindrical cover 120 to be secured to the frame mount 116 with bolts 122.

To attach the mounting bracket 102 to the bicycle 98, the frame mount 116 is provided around a frame portion 124 of the bicycle 98 and the cover 120 is secured to the frame mount 116 with the bolts 122 (FIGS. 12 and 15). To secure the apparatus 10 to the mounting bracket 102, the bracket 82 of the apparatus 10 is provided with a rectangular aperture 126 and the bracket 82 is slid over the hollow tube 104. As the bracket 82 slides over the hollow tube 104, the bracket 82 contacts the latch 112, and the angled forward portion of the latch 112 causes the latch 112 to be forced downward into the hollow tube 104. Once the latch has passed into the bracket 82 and under the aperture 126, the strip 110 forces the latch 112 upward through the aperture 126. Because the rear portion of the latch 112 is flat, the bracket 82 cannot inadvertently come loose from the hollow tube 104. If it is desired to remove the apparatus 10, the pin 114 is depressed until the strip 110 moves the latch 112 past the aperture 126 and the bracket 82 is pulled away from the hollow tube 104. It should be noted that the mounting bracket 102 may also be secured to the interior or exterior of an automobile (not shown) or anywhere else it is desired to secure the apparatus 10.

If it is desired to pull the apparatus 10 along the ground, the apparatus 10 is pivoted into the satchel orientation as described above (FIG. 9), the pull handle 92 is pivoted upward and the extensible shaft 90 is extended (FIG. 14). The pull handle 92 is then used to raise a portion of the apparatus 10 so that the apparatus 10 may roll along the wheels 94 provided on the top 18 of the upper section 14 and the bottom 28 of the lower section 16 (FIGS. 13 and 14).

Figure 16:
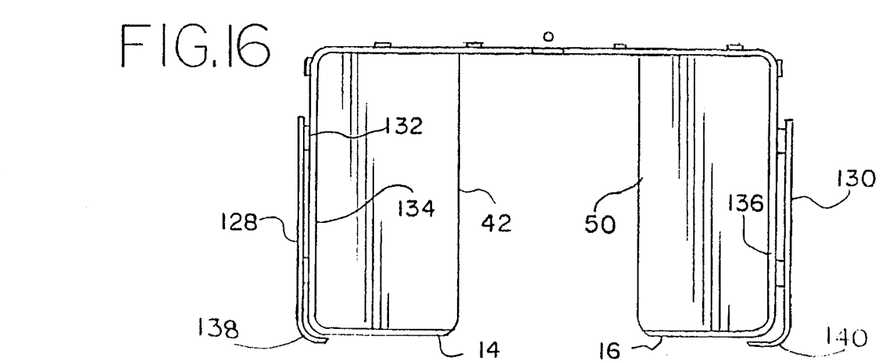
FIG. 16 is a side elevation of an alternative embodiment of the present invention.
Figure 17:
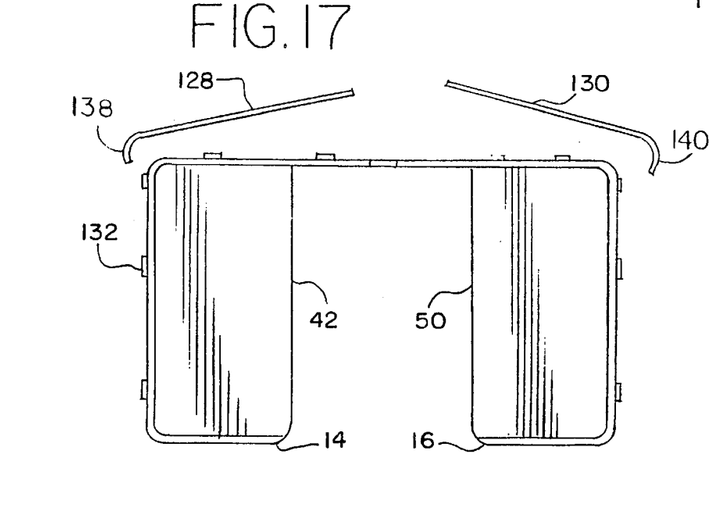
FIG. 17 is a side elevation of the alternative embodiment of the present invention, showing the covers detached.
Figure 18:
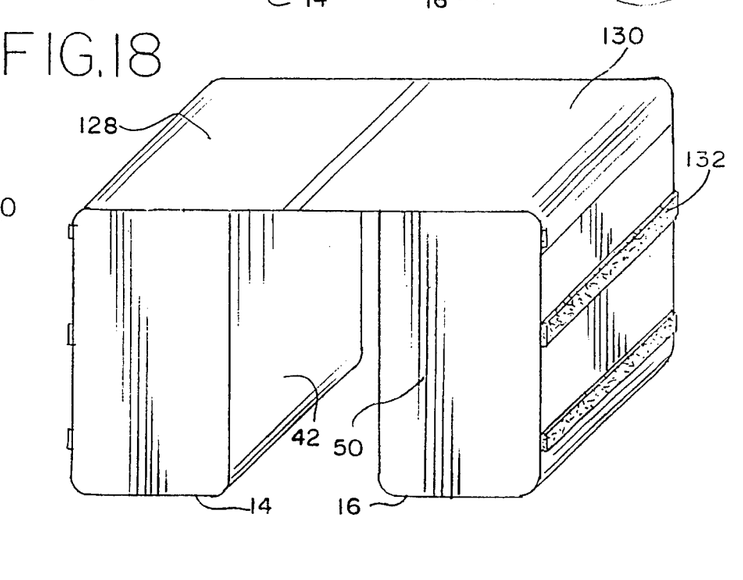
FIG. 18 is a perspective view of the alternative embodiment of the present invention, showing the covers mounted on the apparatus to form a table.

Another use of the apparatus is for a table (FIG. 18). In this embodiment of the apparatus 10, two covers 128 and 130 are secured to the upper section 14 and lower section 16 respectively with latch and hook material 132. The covers 128 and 130 are preferably attached to the backs 134 and 136 of the upper section 14 and lower section 16 to protect the upper storage element 42 and the lower storage element 50 (FIG. 16). The covers 128 and 130, may be constructed of plastic, metal, cloth, or any other supportive material and are constructed with curved ends 138 and 140 to provide added protection to the apparatus 10 in all orientations. To use the covers 128 and 130 the apparatus 10 is moved into the face to face orientation as described above and the supports 84, 85, 86 and 87 are extended (FIG. 16). The covers 128 and 130 are removed and attached to the supports 84, 85, 86 and 87 by the latch and hook material 132 (FIGS. 17 and 18). Once in this orientation the apparatus 10 may be used as a table or as a bike rack when attached to the bicycle 94 (FIGS. 12 and 18).

The foregoing description and drawings merely explain and illustrate the invention and the invention is not limited thereto, except in so far as the amended claims are so limited, as those skilled in the art who have the disclosure before them will be able to make modifications and variations therein without departing from the scope of the invention. By way of example, the apparatus 10 may be provided with several articulated sections to allow an even greater range of movement of the user.

What is claimed is:

1. An articulated backpack apparatus for transporting material while attached to a user, in which an upper storage element of the apparatus is capable of pivotal movement in relationship to a lower storage element of the apparatus, said articulated backpack apparatus comprising:
   (a) an upper storage element;
   (b) a lower storage element operably secured to said upper storage element by pivot means for allowing said upper storage element to pivot relative to said lower storage element when said upper storage element and said lower storage element are attached to a user;
   (c) a shoulder strap operably secured to said upper storage element;
   (d) a belt member;
   (e) said pivot means enabling said upper storage element to pivot from a side-by-side relationship to a face-to-face relationship relative to said lower storage element; and
   (f) means operably secured to said upper storage element and operably secured to said lower storage element for allowing said upper storage element to be moved away from said lower storage element while substantially maintaining said face-to-face relationship relative to said lower storage element and while maintaining operably connected to said lower storage element.

2. The articulated backpack apparatus of claim 1, further comprising:
   (a) a belt member and means secured to said lower storage element for securing said lower storage element releasably to said belt member, said securing means allowing rotational movement of said lower storage element relative to said belt member.

3. The articulated backpack apparatus of claim 2, wherein said securing means is an automatic locking means for receiving and engaging a pin member secured to said belt member.

4. The articulated backpack apparatus of claim 3, further comprising remote release means mounted laterally of said locking means and operably secured to said locking means for releasing said locking means from a remote location.

5. The articulated backpack apparatus of claim 4, wherein said remote release means comprises a cord having a first end and a second end with said first end secured to said locking means and said second end extending beyond the transverse confines of said lower storage element.

6. The articulated backpack apparatus of claim 3 further comprising guide means secured to the apparatus for guiding said pin member of said belt member into engagement with said locking means.

7. The articulated backpack apparatus of claim 1 further comprising means secured to the apparatus for releasably securing the apparatus to a bicycle frame.

8. The articulated backpack apparatus of claim 1, further comprising wheels operably secured to the apparatus.

9. The articulated backpack apparatus of claim 1, further comprising an extensible handle assembly operably secured to the apparatus.

\* \* \* \* \*